United States Patent [19]
Hickman

[11] Patent Number: 5,123,545
[45] Date of Patent: * Jun. 23, 1992

[54] STACKABLE STORAGE AND DISPENSING RACK FOR RECTANGULAR ARTICLES

[76] Inventor: Sherman T. Hickman, 819 Gober, Houston, Tex. 77017

[*] Notice: The portion of the term of this patent subsequent to Feb. 23, 2006 has been disclaimed.

[21] Appl. No.: 103,715

[22] Filed: Oct. 2, 1987

[51] Int. Cl.⁵ .................................... A47F 5/01
[52] U.S. Cl. .................. 211/59.2; 211/128; 211/181; 211/194
[58] Field of Search .......... 211/59.2, 59.3, 41, 211/128, 181, 194

[56] References Cited

U.S. PATENT DOCUMENTS

| | | | |
|---|---|---|---|
| 2,905,330 | 9/1959 | Lilja | 211/59.2 |
| 3,007,580 | 11/1961 | Dickson | 211/593 |
| 3,203,553 | 8/1965 | Pendergrast et al. | 211/59.2 |
| 3,528,558 | 9/1970 | Williams | 211/59.2 |
| 3,606,022 | 9/1971 | Beesley | 211/59.2 |
| 3,780,873 | 12/1973 | Silva | 211/59.3 |
| 4,191,296 | 3/1980 | Morgan | 211/59.2 |
| 4,294,363 | 10/1981 | Oztekin et al. | 211/59.2 |
| 4,331,243 | 5/1982 | Doll | 211/59.2 |

Primary Examiner—Robert W. Gibson, Jr.
Attorney, Agent, or Firm—Gunn, Lee & Jackson

[57] ABSTRACT

A stackable storage and dispensing rack for multiple articles such as computer tape cassettes which includes a plurality of side frames each being formed by a perimeter member of generally rectangular configuration, an intermediate structural member extending longitudinally of the perimeter member and an intermediate strut member oriented in substantially normal relation to the intermediate structural member. The side frames are secured in side-by-side relation by means of upper and lower stringer members and form elongated article storage and dispensing compartments between each side frame member. An article support in the form of a single elongated support wire is positioned between the lower portions of the side frames to support the articles and to permit the articles to slide toward the front of the rack when the rear portion of the rack is elevated. A restraint, in the form of a flange is secured to the lower rear portion of the rack and is received over a structural support to enable the lower rack to be positioned in inclined manner. The restraint flanges of vertically stacked racks will engage the upper rear portion of the rack immediately there beneath to thus support stacked racks at the same angle of inclination of the lower rack.

15 Claims, 3 Drawing Sheets

STACKABLE STORAGE AND DISPENSING RACK FOR RECTANGULAR ARTICLES

FIELD OF THE INVENTION

This invention relates generally to storage and dispensing racks for rectangular articles such as certain computer tape cassettes and more specifically concerns stackable storage and dispensing racks that are oriented to provide for extremely dense storage of computer tape cassettes while at the same time permitting ready access to the articles by operating personnel.

BACKGROUND OF THE INVENTION

While the present invention relates to stackable storage and dispensing racks for various articles of rectangular shape, it is particularly designed for use in storage and access of rectangular computer tape cassettes. The term "computer tape cassette" therefore is not intended to be limiting of the spirit and scope of this invention. Where this term is employed in this specification, it is intended that its meaning be sufficiently broad as to include other articles of generally rectangular configuration.

The computer industry has seen rapid development over the years and provide a readily available system for acquisition and storage of data that can be used repeatedly in further computer related activities. Historically, computer data has been stored on large storage reels that are typically packaged in large circular containers These containers of computer tape must be stored in such manner that they are maintained in a clean, temperature controlled environment and stored in such manner that operating personnel will have ready and efficient access to them. Typically, computer tape storage racks are employed having a number of vertical shelves with computer tape containers being stored in side-by-side relation, one container deep. Typically computer tape storage shelving is arranged in rows having several vertical shelves or tiers within which the tape containers are positioned. This type of computer tape storage system has gained wide acceptance such that many large companies utilize a large amount of storage space for storing computerized data.

In recent years, computer tape has been provided in small cassettes such as the "3480 cassette" manufactured and sold by International Business Machines, Inc. The IBM 3840 cassette has gained such wide acceptance because they are of smaller dimension, more easily handled and can be stored in much more dense fashion in a computer tape storage area. It is desirable, therefore, to provide a storage system for computer tape cassettes that will permit more dense and efficient storage of computer tape cassettes than has been accomplished in the past and yet which will permit ready and efficient access to the computer tapes by operating personnel.

SUMMARY OF THE INVENTION

It is a principal feature of the present invention to provide a stackable storage rack for computer tape cassettes and other similar articles which permits dense and accessible storage of computer tape cassettes.

It is also a feature of this invention to provide a novel computer tape storage system which enables the use of existing shelving, typically found within computer tape storage areas, and yet achieve dense and efficient storage of computer tape cassettes.

It is also a feature of this invention to provide a novel computer tape cassette storage system which is effectively designed to provide effective and accessible storage for rectangular computer cassettes such as the IBM 3480 cassettes.

Briefly, the present invention relates to a storage and dispensing rack for small, rectangular computer tape cassettes and other similar articles which is composed almost completely of wire such as chrome plated wire secured in assembly by spot welding. The storage and dispensing racks may be of any suitable width and of any suitable depth as suits the design of the user. Each of the storage racks defines a plurality of elongated channels with several computer tape cassettes being retained in each channel. The storage and dispensing racks are arranged for positioning in inclined relation with the rear portion thereof elevated sufficiently that the computer tape cassettes will slide forwardly. The first cassette in each channel will be located for ready access at a dispensing opening provided at the front of each channel. Typically each rack will be provided with multiple computer tape channels that are located in side-by-side relation, there being any suitable number of channels as suits the needs of the user.

It is also desirable that the computer tape storage racks be of inexpensive nature and yet have sufficient strength that they are durable and serviceable for lengthy periods of time. The racks must also be of sufficient structural integrity that they may be stacked one upon another several tiers high without causing any damage to the rack structure or to the computer tape cassettes stored therein. The stackable storage and dispensing rack takes the general form of a relatively rigid wire framework forming multiple side-by-side channels or receptacles each being of sufficient depth to contain several serially arranged computer tape cassettes. The wire framework is defined by a plurality of generally rectangular side frames which are each disposed in generally parallel relation with adjacent side frames. Each side frame includes a perimeter member in the form of a single wire which bent to a generally rectangular form and has the ends thereof interconnected such as by spot welding or by any other suitable means of connection. The perimeter member forms generally parallel upper and lower perimeter sections and generally parallel front and rear sections. An intermediate structural member extends longitudinally of the perimeter member between the upper and lower sections and is interconnected by spot welding to the front and rear sections. An intermediate strut is provided having its upper and lower ends interconnected with the upper and lower sections. Typically the strut member is oriented in generally parallel relation with the front and rear sections.

The side frames are interconnected by upper and lower stringer members which extend the complete length of the wire rack. The stringers are connected by spot welding to the upper and lower sections of the side frames and thus function to secure the side frames in parallel, immovable relation with one another.

Support for the computer tape cassettes is provided by a single support wire for each tape cassette receptacle. The support wire extends between and in generally parallel relation with the lower sections of adjacent side frames such that the computer tape cassettes are efficiently supported in low friction relation thereon. The cassettes will readily slide on the support wire when the storage rack is inclined for example in the range of about 10° to about 20° from the horizontal. Each of the cassette support wires includes an upwardly turned end portion which serve respectively as front and rear stops for the tape cassettes to prevent the cassettes from sliding forwardly from the tape receptacles or being forced rearwardly out of the tape receptacles.

In an alternative form of the invention, the side frames include an inclined forward portion to expose a forward corner of the first tape cassette to thus permit it to be easily grasped and removed from the cassette receptacles. The lower sections of the side frames include an offset portion enabling the lower section to provide lateral support for each side of the cassettes to thus permit them from being moved laterally from within the cassette storage receptacle. Additionally, the intermediate structure support for each side frame may be formed of wire which is bent to a configuration establishing the vertical strut structure for the side frame. In this instance a single wire forms the intermediate structural support and the vertical strut structure of each side frame.

BRIEF DESCRIPTION OF THE DRAWINGS

So that the manner in which the above recited features, advantages and objects of this invention as well as others which will become apparent are attained and can be understood in detail, a more particular description of the invention, briefly summarized above, may be had by reference to the embodiments thereof that are illustrated in the appended drawings, which drawings form a part of this specification.

It is to be noted, however, that the appended drawings illustrate only typical embodiments of this invention and are therefore not to be considered limiting of its scope, for the invention may admit to other equally effective embodiments.

IN THE DRAWINGS

Figure 1:
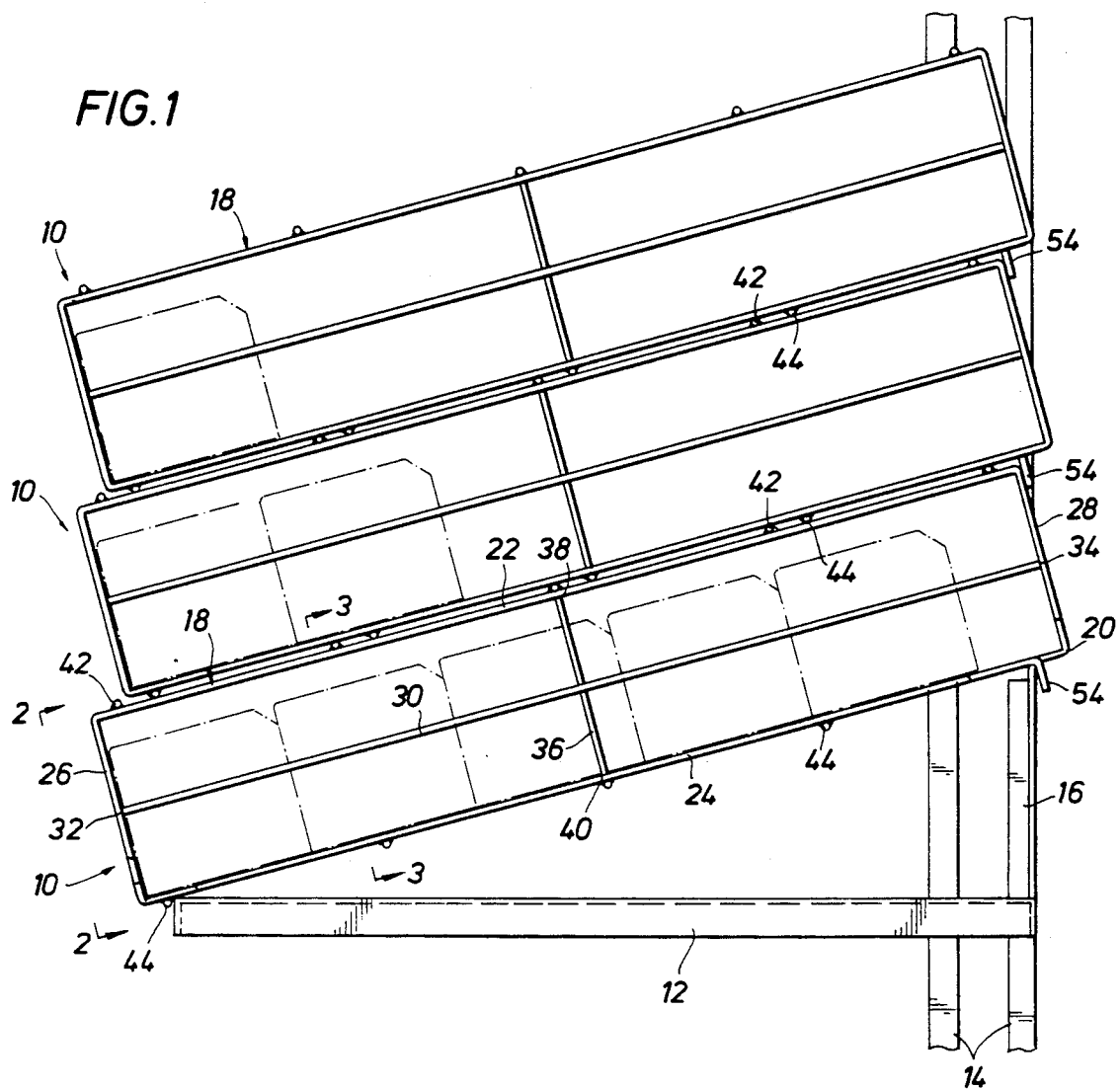
Figure 2:
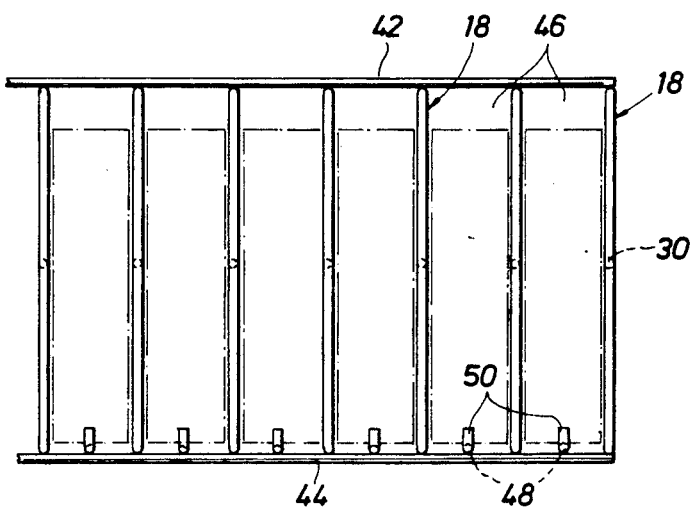
Figure 3:
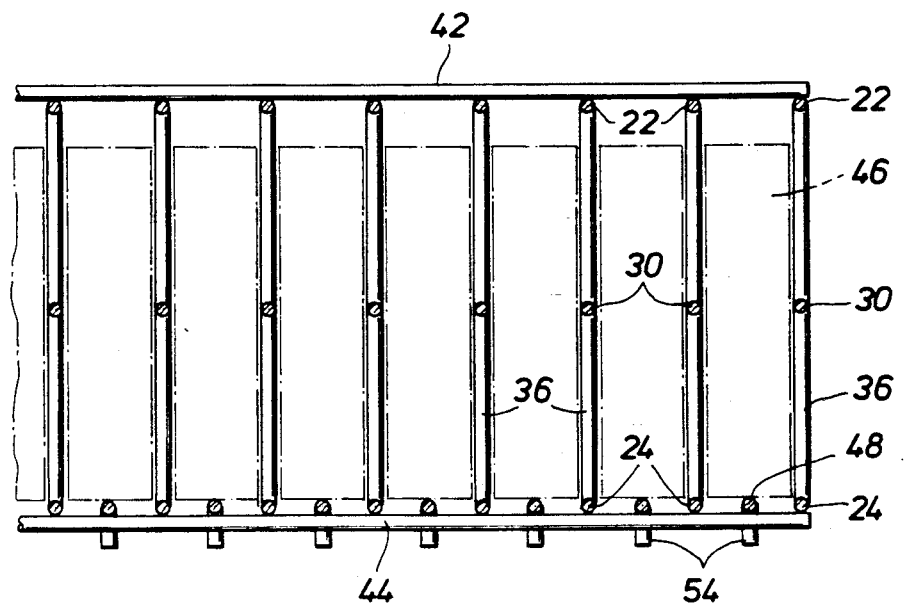
Figure 5:
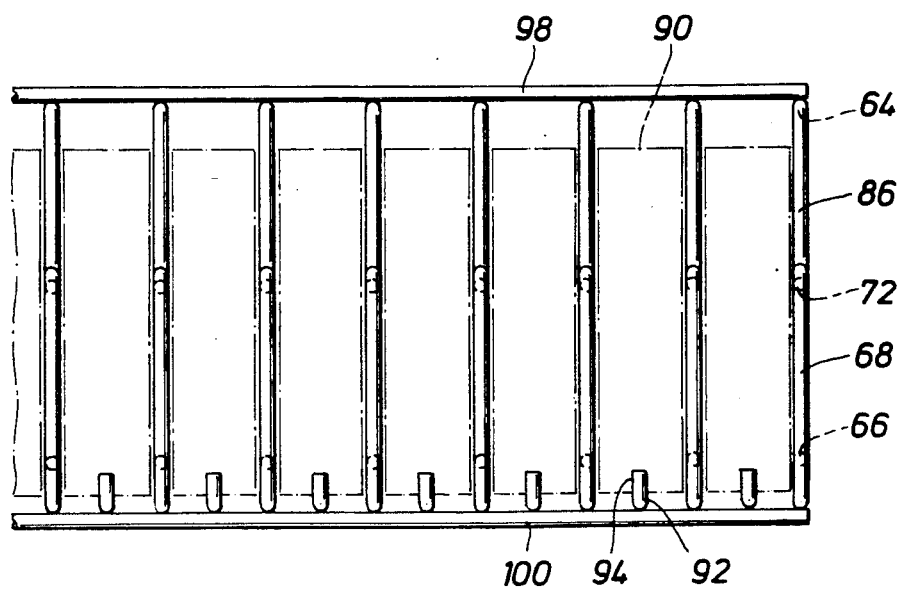
Figure 4:
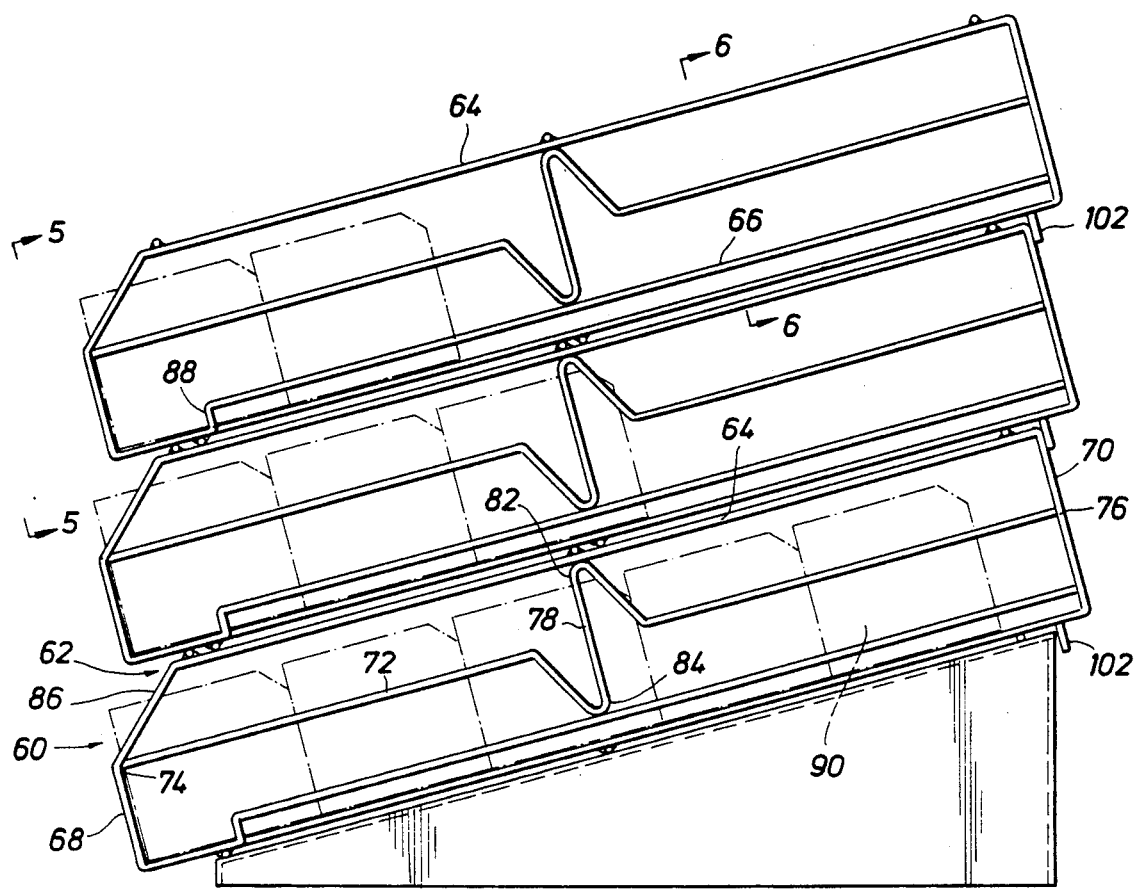
Figure 6:
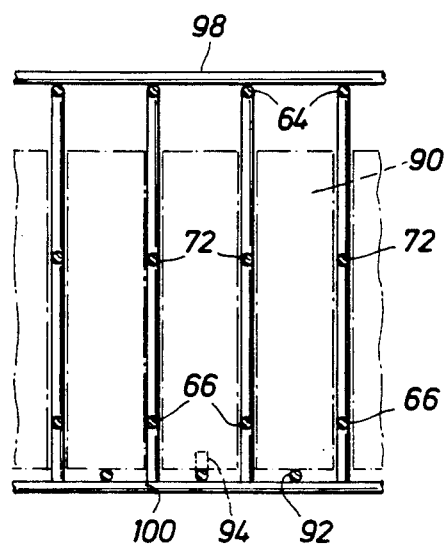

FIG. 1 is a side elevational view showing a plurality of stackable computer tape storage racks constructed in accordance with this invention, the storage racks being supported by shelving structure and stacked several tiers high;

FIG. 2 is an end view taken along line 2—2 of FIG. 1 and illustrating the front portion of a computer tape storage rack structure having a plurality of computer tape cassettes disposed therein;

FIG. 3 is a sectional view taken along line 3—3 of FIG. 1 further illustrating the arrangement of interconnected wires forming cassette storage and dispensing rack;

FIG. 4 is a side elevational view of a stackable storage and dispensing rack representing an alternative embodiment of this invention;

FIG. 5 is an end view of the cassette storage and dispensing rack of FIG. 4; and FIG. 6 is a sectional view taken along 6—6 of FIG. 4.

DETAILED DESCRIPTION OF THE PREFERRED EMBODIMENT

Referring now the drawings and first to FIG. 1, a cassette tape storage and dispensing rack system is shown wherein individual racks illustrated generally at 10 are capable of being stacked several tiers high is illustrated generally at 10. The storage and dispensing racks 10 are shown to be stacked several tiers high and supported in inclined relation by conventional shelving including a horizontal shelf 12 which is in turn supported by vertical structural members 14 of the shelving. The shelving is provided with a support member 16 of a suitable height to support the stackable racks of this invention in inclined relation as shown. Although the stackable racks are shown to be positioned at 15° relative to the horizontal, such positioning is not intended to limit the spirit and scope of the present invention The inclination of the storage and dispensing racks need only be sufficient that articles contained therein are caused to slide by gravity to the forward or dispensing end thereof.

Each of the stackable racks includes a plurality of side frames illustrated generally at 18 which are defined by a perimeter member formed of a single length of bent wire such as chrome plated wire. The wire of the perimeter member 20 is bent to form upper and lower sections 22 and 24 and front and rear sections 26 and 28. The ends of the wire forming the perimeter member 20 are fused or otherwise joined together. The upper and lower sections 22 and 24 are disposed in substantially parallel relation and the front and rear sections 26 and 28 are also disposed in substantially parallel relation with one another and in substantially normal relation with the upper and lower sections. An intermediate structural member 30 is extended longitudinally of the perimeter member 20 and is disposed between the upper and lower sections 22 and 24 with the respective ends 32 and 34 thereof secured to respective ones of the front and rear sections 26 and 28. The intermediate structure member 30 is also composed of wire or other suitable material capable of forming a substantially rigid open rack framework structure. It may be composed of plated wire of the same character of that composing the perimeter member 20. To enable the rack structure to withstand significant vertical loads when stacked in multiple tiers, the rack structure is provided with an intermediate strut member 36 having its upper and lower ends 38 and 40 secured by spot welding or by other suitable means of connection to the respective upper and lower sections 22 and 24 of the side frames.

As shown in FIG. 2 the storage and dispensing rack 10 incorporates a plurality of side frames 18 which are disposed in side-by-side, generally parallel relation which are secured in immovable relation by means of upper and lower stringer members 42 and 44, there being provided a number of stringers along the upper and lower sections of the side frames. The stringers 42 and 44 are disposed in generally parallel relation with one another and are secured to the respective side frames by fusion, welding or by any other suitable means of connection. The stringers may also be composed of chrome plated wire or any other suitable material capable of providing sufficient structural integrity for supporting cassette filled racks stacked several tiers high.

Adjacent side frames and stringers define elongated cassette receptacles each being capable of receiving several computer tape cassettes serially arranged one behind the other. For example, as shown in FIG. 4, each of the computer tape receptacles of the racks is shown to contain five computer tape cassettes. Obviously, the racks may be of any suitable depth to contain as many computer tape cassettes as is deemed practical.

A plurality of cassette support members 48 are positioned centrally at the lower portion of each of the cassette receptacles 46 and are secured to the lower stringer members 44 by welding or any other suitable means of attachment. The cassette support members 48 may also be formed of plated wire material similar to the structure of the side frames and stringers, or in the alternative, may be formed of any other suitable material. It is desirable that the cassettes be supported in adequate manner to prevent inadvertent separation from the receptacles 46. It is also appropriate that the cassettes be supported in such manner that low friction engagement occurs between the cassettes and the cassette supports. When plated wires are employed as cassette support members in the manner shown in the drawings each cassette has single line contact with its respective cassette support member, that contact occurring centrally of the lower surface of the cassette. The extremely smooth surface provided by plated wire provides a low friction support for the cassette, which is typically composed of any one of a number of polymer materials. This low friction supporting capability permits the cassette to slide forwardly on the cassette support member under the influence of gravity when the storage and dispensing rack 10 is inclined only to a slight extent. As shown in FIG. 1 the inclination of the rack structure 10 is at 15° from the horizontal established by shelf 12. Although computer tape cassettes will readily slide to the forward end of the rack when the rack is elevated at 15°, such is not intended as limiting the scope of this invention. The racks may be elevated to any inclined position that achieves gravity induced sliding movement of the cassettes to the forward end of the rack where they may be grasped and serially removed by operating personnel. It should also be noted that it is not necessary that the shelf 12 remain horizontal. In fact, the shelf 12 may be inclined to the same extent as the racks are inclined and the lower stringers 44 of the racks may simply rest on the upper flat surface of the shelf.

It is desirable to prevent the computer tape cassettes from inadvertently sliding out the forward open ends of the receptacles 46 and it is also desirable to prevent the cassettes to be forced rearwardly out of the open rear ends of the receptacles. To accomplish these features, each of the cassette support members 48 is provided with upturned front and rear end portions 50 and 52. As the cassettes slide forwardly within the receptacles the upturned end portions 56 of the cassette supports will function as stops to limit forward movement of the first cassette of each receptacle. To remove the first cassette therefore, operating personnel will simply raise the cassette within its receptacle, causing it to clear the upper end of the upturned stop 50 to thus permit it to be extracted from its receptacle. As soon as the first tape cassette is removed, the remaining cassettes in the receptacle will slide forwardly under the influence of gravity until the first contact cassette the respective stop member 50.

To permit the first cassette to be removed from its receptacle 46, the several cassettes in a particular receptacle are moved rearwardly by application of manual force to the first cassette. This rearward movement can continue only until the last cassette comes into contact with the upturned stop portion 52 of the respective cassette support member 48. The rear stop member 52 thus prevents the cassettes from being ejected rearwardly from a cassette receptacle.

For support of the rack 10 in the inclined position shown in FIGS. 1 and 4, the shelf structure 14 is provided with a support member 16 which extends to a suitable height. A retainer flange 54 is secured such as by welding to the rear portions of the lower sections 24 of each frame member. The retainer flange of the lower rack 10 is positioned over the upper end of support 16 thus preventing the lower rack from sliding forwardly on the shelf 12. The retainer flanges of additional storage and dispensing racks 10 will engage over the upper corners of the frames of the rack located immediately below. Thus, several storage and dispensing racks may be stacked one upon another to thereby provide the cassette storage and dispensing facility with significant density of storage within a given volume of space. In fact, the racks may be stacked to any suitable height within the structural integrity of the lower-most racks. Moreover, each of the storage and dispensing racks is of portable nature and may be quickly removed without necessitating the use of tools or special equipment. Further, it may not be necessary to unload computer tape cassettes from the racks as the racks are removed and transported from place to place. Also, the storage and dispensing racks may be of any suitable width to permit efficient storage and handling of a large number of cassettes. For example, the racks may be manufactured in various widths such as 24, 36 or 48 cassettes wide so as to fit appropriate spaces provided by conventional shelving. Any combination of racks of various widths may be employed in side-by-side relation without interfering with one another.

Referring now to FIGS. 4–6, an alternative embodiment of the invention is illustrated with each cassette storage and dispensing rack being illustrated at 60. Each storage and dispensing rack incorporates a plurality of side frame elements illustrated generally at 62 which include perimeter members in the form of a single length of plated wire which is bent to define upper and lower sections 64 and 66 and front and rear sections 68 and 70. An intermediate structural member 72 includes end portions 74 and 76 which are secured by welding or other suitable means of connection to the front and rear sections 68 and 70. The intermediate structural members are deformed between the ends thereof to form an intermediate strut portion 78 and bent portions 82 and 84 that are secured such as by welding to the upper and lower sections 64 and 66. The frame structures 62 of the storage and dispensing rack 60 differ from those set forth in FIGS. 1-3 in that the front section 68 includes a beveled portion 86 which exposes the upper corner of the first cassette element, thus allowing it to be readily grasped and moved upwardly by operating personnel enabling it to be removed from its storage receptacle. Also, the lower section 66 is offset upwardly as shown at 88 thus permitting the greater extent of the lower section 66 to be elevated above the lower end of the cassettes 90 to provide lateral support for the cassettes in the manner shown in FIG. 6. Thus, the lower extremities of the cassettes cannot be moved inadvertently sideways to the extent that they become jammed within or separated from their storage receptacles.

Each of the storage receptacles is provided with a cassette support member as shown at 92 which provides a low friction support and guide member for individual cassettes located in each storage and dispensing receptacle. The support and guide member 92 is provided with upturned front and rear ends 94 and 96 which provide front and rear stops for the front and rear cassettes to prevent inadvertent separation thereof from the storage and dispensing receptacle. Upper and lower stringer members 98 and 100 are welded or otherwise secured to the upper section 64 and to the lower sections 66 and cassette support member 92 in the manner discussed above in connection with FIG. 2.

The stackable cassette storage and dispensing racks are each provided with retainer flanges such as shown at 102 which are fixed to the lower sections of the frames and which serve to restrain the racks in supported engagement relative to one another. The retainer flange 102 of the lower rack is adapted to engage over a structural member of a conventional storage shelf to thus position the lower rack at an inclined position so that the cassettes will slide on the support member 92 to the front stop 94.

The entire cassette storage and dispensing rack 60 may be composed of wire which is plated with chrome or with any other suitable protective material. The rack structures may also be composed of other suitable materials within the spirit and scope hereof.

In view of the foregoing, it is respectfully submitted that I have provided a novel storage and dispensing rack structure for computer tape cassettes and other similar objects thus enabling them to be stored in serially arranged fashion within multiple storage compartments and stored densely in side-by-side rows and in multiple tiers to thereby achieve maximum density of storage within space of a given volume. At the same time the individual cassettes will be readily accessible to users. The present invention, therefore is well adapted to attain all of the features and advantages hereinabove set forth together with other advantages which will become obvious and inherent from a description of the apparatus itself. It will be understood that certain combinations and sub-combinations are of utility and may be employed without reference to other features and sub-combinations. This is contemplated and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. A stackable storage and dispensing rack for multiple articles such as computer tape cassettes and the like, comprising:
   (a) a plurality of generally rectangular side frames disposed in generally parallel spaced relation, each of said side frames comprising:
      (1) a perimeter member comprising a single wire bent to a generally rectangular form with the ends thereof interconnected, said perimeter member forming generally parallel upper and lower sections and generally parallel front and rear sections;
      (2) an intermediate structural member extending longitudinally of said perimeter member between said upper and lower sections and having the ends thereof interconnected with said front and rear sections;
      (3) an intermediate strut member having the ends thereof interconnected with said upper and lower sections and being oriented in generally parallel relation with said front and rear sections;
   (b) upper and lower stringer members interconnected respectively with upper and lower sections of a plurality of spaced side frames;
   (c) an article support member extending between and in generally parallel relation with said lower sections said article support member forming front and rear stops to prevent inadvertent separation of articles from said storage and dispensing rack; and
   (d) restraint means depending from the rear of each of said lower sections of said frame members and adapted to engage a shelf structure and restrain said storage and dispensing rack in a downwardly and forwardly inclined position.

2. A stackable storage and dispensing rack as recited in claim 1 wherein:
   said article support member comprises a single support wire positioned between and in generally parallel relation with lower sections of adjacent side frames and being interconnected with and supported by said lower stringer members, said article support member providing support for serially arranged articles.

3. A stackable storage and dispensing rack as recited in claim 2, wherein:
   said article support member defines front and rear stops at respective extremities thereof which are engaged by said articles to prevent inadvertent separation of said articles from the front and rear portions of said storage and dispensing rack.

4. A stackable storage and dispensing rack as recited in claim 3 wherein:
   said stop means is defined by upturned front and rear extremities of said article support member.

5. A stackable storage and dispensing rack as recited in claim 1, wherein said restraint means comprises:
   a retainer flange extending from the lower rear portion of said storage and dispensing rack and adapted to engage over an elevated member to position said storage and dispensing rack in downwardly and forwardly inclined position and enabling a storage and dispensing rack stacked upon another to be supported and positioned at the same angle of inclination as the storage and dispensing rack positioned beneath it.

6. A stackable storage and dispensing rack as recited in claim 1, wherein:
   said lower sections of adjacent frame members provide lateral support for the lower portions of articles contained within said storage and said dispensing rack.

7. A stackable storage and dispensing rack as recited in claim 6, wherein:
   said lower section of each of said side frames is offset at the forward end portion thereof such that a forward part of said lower section extends to the lower portion of said storage and dispensing rack while the remaining portion of said lower section is elevated above the lower portion of said storage and dispensing rack.

8. A stackable storage and dispensing rack as recited in claim 1, wherein:
   said front section defines an inclined upper portion exposing the upper front corner of the first article thus permitting it to be readily grasped and manipulated by the user.

9. A stackable storage and dispensing rack for multiple articles such as computer tape cassettes and the like, comprising:
   (a) a plurality of generally rectangular side frames disposed in generally parallel spaced relation, each of said side frames comprising:

(1) a perimeter member comprising a single wire bent to a generally rectangular form with the ends thereof interconnected, said perimeter member forming generally parallel upper and lower sections and generally parallel front and rear sections;

(2) an intermediate structural member extending longitudinally of said perimeter member between said upper and lower sections and having the ends thereof interconnected with said front and rear sections;

(3) an intermediate strut member having the ends thereof interconnected with said upper and lower sections and being oriented in generally parallel relation with said front and rear sections;

(b) upper and lower stringer members interconnected respectively with upper and lower sections of a plurality of spaced side frames and supporting said side frames in substantially parallel relation;

(c) an article support member extending between and in generally parallel relation with said lower sections said article support member forming front and rear stops to prevent inadvertent separation of articles from storage and dispensing receptacles defined between adjacent side frames of said storage and dispensing rack; and (d) restraint means depending from the rear of each of said lower sections of said frame members and adapted to engage a shelf structure and restrain said storage and dispensing rack in a downwardly and forwardly inclined position.

10. A stackable storage and dispensing rack as recited in claim 9, wherein:

said side frames and said article support members are composed of wire and said front and rear stops are formed by turned up ends of said article support member.

11. A stackable storage and dispensing rack as recited in claim 10, wherein:

said article support members are formed by single wires positioned between and in substantially parallel relation with said lower sections.

12. A stackable storage and dispensing rack as recited in claim 11, wherein said restraint means comprises:

a retainer flange extending from the lower rear portion of said storage and dispensing rack and adapted to engage over an elevated member to position said storage and dispensing rack in downwardly and forwardly inclined position and enabling a storage and dispensing rack stacked upon another to be supported and positioned at the same angle of inclination as the storage and dispensing rack positioned beneath it.

13. A stackable storage and dispensing rack as recited in claim 12, wherein:

said lower sections of adjacent frame members provide lateral support for the lower portions of articles contained within said storage and said dispensing rack.

14. A stackable storage and dispensing rack as recited in claim 13, wherein:

said lower section of each of said side frames is offset at the forward end portion thereof such that a forward part of said lower section extends to the lower portion of said storage and dispensing rack while the remaining portion of said lower section is elevated above the lower portion of said storage and dispensing rack.

15. A stackable storage and dispensing rack as recited in claim 9, wherein:

said front section defines an inclined upper portion exposing the upper front corner of the first article thus permitting it to be readily grasped and manipulated by the user.

* * * * *